United States Patent
Ito et al.

(10) Patent No.: US 9,436,465 B2
(45) Date of Patent: Sep. 6, 2016

(54) MOVING AVERAGE PROCESSING IN PROCESSOR AND PROCESSOR

(71) Applicant: FUJITSU LIMITED, Kawasaki-shi, Kanagawa (JP)

(72) Inventors: Makiko Ito, Kawasaki (JP); Manabu Kubota, Kasuga (JP); Kazuhiro Nomoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 348 days.

(21) Appl. No.: 14/246,757

(22) Filed: Apr. 7, 2014

(65) Prior Publication Data

US 2014/0351566 A1 Nov. 27, 2014

(30) Foreign Application Priority Data

May 23, 2013 (JP) .................................. 2013-109210

(51) Int. Cl.
*G06F 9/30* (2006.01)
*G06F 7/544* (2006.01)

(52) U.S. Cl.
CPC ............. *G06F 9/3001* (2013.01); *G06F 7/544* (2013.01); *G06F 9/30018* (2013.01); *G06F 9/30036* (2013.01)

(58) Field of Classification Search
CPC ............. G06F 9/3001; G06F 9/30018; G06F 9/30036; G06F 7/544
See application file for complete search history.

(56) References Cited

U.S. PATENT DOCUMENTS

| 4,903,019 A | 2/1990 | Ito |
| 2014/0365747 A1* | 12/2014 | Ould-Ahmed-Vall ..................... G06F 9/30036 712/4 |

FOREIGN PATENT DOCUMENTS

| JP | 64-061114 | 3/1989 |
| JP | 10-143495 | 5/1998 |
| JP | 10-285502 | 10/1998 |
| JP | 2011-233085 | 11/2011 |
| JP | 2012-075023 | 4/2012 |

* cited by examiner

*Primary Examiner* — Benjamin Geib
(74) *Attorney, Agent, or Firm* — Fujitsu Patent Center (57) ABSTRACT

A processor, which executes m number of arithmetic operations in parallel, executes a partial sum instruction which takes an i-th to (i+m−1)-th elements of an input data series as input elements, so as to obtain first vector data, executes the partial sum instruction which takes a (i+x)-th to (i+x+m−1)-th elements of the input data series as the input elements, so as to obtain second vector data, and performs operations to subtract the p-th element of the first vector data and add the p-th element of the second vector data from and to a sum of the i-th to (i+x−1)-th elements of the input data series in parallel for each of the 0-th to (m−1)-th elements, so as to calculate sums of elements for m sections different from each other in parallel, and moving average processing to calculate a moving average from the sums of elements of the sections.

15 Claims, 12 Drawing Sheets

|   | MASK VALUE SET INSTRUCTION |
|---|---|
| 0 OR LESS | 0 0 0 · · · 0 0 0 |
| 1 | 1 0 0 · · · 0 0 0 |
| 2 | 1 1 0 · · · 0 0 0 |
| ⋮ | ⋮ |
| k | 1 1 · · · 1 0 · · · 0 0 <br> k BIT    (m−k) BIT |
| ⋮ | ⋮ |
| (m−1) | 1 1 1 · · · 1 1 0 |
| m OR MORE | 1 1 1 · · · 1 1 1 |

FIG. 8B

|   | MASK VALUE SET INSTRUCTION_R |
|---|---|
| 0 OR LESS | 0 0 0 · · · 0 0 0 |
| 1 | 0 0 0 · · · 0 0 1 |
| 2 | 0 0 0 · · · 0 1 1 |
| ⋮ | ⋮ |
| k | 0 0 · · · 0 1 · · · 1 1 <br> (m−k) BIT    k BIT |
| ⋮ | ⋮ |
| (m−1) | 0 1 1 · · · 1 1 1 |
| m OR MORE | 1 1 1 · · · 1 1 1 |

FIG. 9

```
idx0=-x;
for(i=0;i<N;i+=m){
    m0=MASK VALUE SET INSTRUCTION_R(idx0+m);   ←901
    vt=VECTOR LOAD(&in_buf[idx0],m0);
                                               902
        ⋮
    idx0+=m;   ←903
}
```

FIG. 10

```
idx1=n;
for(i=0;i<N;i+=m){
        m1 = MASK VALUE SET INSTRUCTION (idx1);    ~1001
        vu = VECTOR LOAD(& in_bif[i],m1) ;         ~1002
            .
            .
        idx1-=m;    ~1003
}
```

FIG. 11

```
idx2=-c+1;
for(i=0;i<N;i+=m){
   m2=MASK VALUE SET INSTRUCTION_R(idx2+m);    ~1101
     .
   DATA STORE(&out_buf[idx2],m2,MOVING AVERAGE RESULT) ;
   idx2+=m;                                          \
}           \-1103                                   1102
```

FIG. 12

| i | DIVISOR | COEFFICIENT |
|---|---------|-------------|
| 0~x-1 | i+1 | 1/(i+1) |
| x~n-1 | x | 1/x |
| n~ | x+n-i-1 | 1/(x+n-i-1) |

FIG. 13

```
for(i=0;i<N;i+=m){
    vd=VECTOR LOAD(&div_tbl[i]);    ~1301
    vave=vsum*vd;                    ~1302
         .
         .
}
```

FIG. 14

```
idx0=-x;
idx1=n;
idx2=-c+1;

vsum={0,0,...,0};
for(i=0;i<n+x-c-b;i+=m){
    m0=MASK VALUE SET INSTRUCTION_R(idx0+m);      ~901
    m1=MASK VALUE SET INSTRUCTION(idx1);          ~1001
    vt1=VECTOR LOAD(&in_buf[idx0],m0);            ~902
    vu1=VECTOR LOAD(&in_buf[i],m1);               ~1002
    vd=VECTOR LOAD(&div_tbl[i]);                  ~1301
    vt2=PARTIAL SUM INSTRUCTION(vt1);             ~1401
    vu2=PARTIAL SUM INSTRUCTION(vu1);             ~1402
    vsum=vsum+vu2-vt2;                            ~1403
    vave=vsum*vd                                  ~1302
    m2=MASK VALUE SET INSTRUCTION_R(idx2+m);      ~1101
    DATA STORE(&out_buf[idx2],m2,vave);           ~1102
    idx0+=m;   ~903
    idx1-=m;   ~1003
    idx2+=m;   ~1103
    vsum={vsum[m-1],vsum[m-1],...,vsum[m-1]};
}                                                 ~1404
```

F I G. 15

F I G. 16

```
sum=0;
//PREPROCESSING
for(i=0;i<c-1;i++) sum+=in_buf[i];          ~1601
//FRONT PART PROCESSING
for(j=0,cnt=c;cnt<x;i++,j++,cnt++){
    sum+=in_buf[i];
    avr=sum/cnt;                            ~1602
    out_buf[j]=avr;
}
//MIDDLE PART PROCESSING
for(;i<n;i++,j++){
    sum+=in_buf[i];
    sum-=in_buf[i-x];
    avr=sum/x;                              ~1603
    out_buf[j]=avr;
}
//REAR PART PROCESSING
for(;i<n+b;i++,j++,cnt--){
    sum-=in_buf[i-x];
    avr=sum/cnt;                            ~1604
    out_buf[j]=avr;
}
```

FIG. 17

MOVING AVERAGE PROCESSING IN PROCESSOR AND PROCESSOR

CROSS-REFERENCE TO RELATED APPLICATION

This application is based upon and claims the benefit of priority of the prior Japanese Patent Application No. 2013-109210, filed on May 23, 2013, the entire contents of which are incorporated herein by reference.

FIELD

The embodiments discussed herein are directed to a moving average processing in a processor and a processor.

BACKGROUND

In recent years, various systems are standardized in radio communication technology, and there are ones performing signal processing in a processor called a software-defined radio to be capable of corresponding to various radio communication systems. Conventional radio communication processing achieves high communication performance by parallel processing a large amount of data by hardware logic. Further, increase in operating frequency is not possible in consideration of achieving low power consumption because it is mounted in a mobile apparatus. Accordingly, it is to maintain performance by parallel processing a large amount of data also when software-defined radio processing is performed using a processor, and a processor of SIMD (Single Instruction Multiple Data) type is often used.

In signal processing in the radio communication processing, there is processing which obtains a moving average. Given that the number of elements in a section as a target of moving average is n, with respect to an index i of an input data series the moving average processing is to sequentially obtain an average value of i-th to (i+n−1)-th elements (data) in an input data series while incrementing the value of i. The moving average processing can execute processing efficiently by obtaining the total sum of i-th to (i+n−1)-th elements, thereafter adding an (i+n)-th element and subtracting an i-th element to obtain the total sum of (i+1)-th to (i+n)-th elements, and dividing by the number of elements n in the section to thereby obtain an average value (see, for example, Patent Document 1).

However, the moving average processing which performs addition, subtraction, and the like to an arithmetic result for the i-th to (i+n−1)-th elements and then obtains the next moving average of the (i+1)-th to (i+n)-th elements is difficult to be parallelized due to the relation of dependence of data, and is difficult to be processed effectively by the SIMD type processor.

[Patent Document 1] Japanese Laid-open Patent Publication No. 10-143495

[Patent Document 2] Japanese Laid-open Patent Publication No. 2012-75023

[Patent Document 3] Japanese Laid-open Patent Publication No. 1-61114

[Patent Document 4] Japanese Laid-open Patent Publication No. 10-285502

[Patent Document 5] Japanese Laid-open Patent Publication No. 2011-233085

SUMMARY

One aspect of a moving average processing is to cause a processor, which executes m number of arithmetic operations in parallel, m being an integer of 2 or more, and executes based on 0-th to (m−1)-th input elements a partial sum instruction which calculates a sum of the 0-th to p-th input elements and returns each as a p-th resultant element, p being an integer of 0 to m−1, to execute the following process. Executing the partial sum instruction which takes an i-th to (i+m−1)-th elements of an input data series as the 0-th to (m−1)-th input elements, so as to obtain first vector data, i being an arbitrary number among 0 and natural numbers; executing the partial sum instruction which takes a (i+x)-th to (i+x+m−1)-th elements of the input data series as the 0-th to (m−1)-th input elements, so as to obtain second vector data, x being a natural number; performing operations to subtract the p-th element of the first vector data and add the p-th element of the second vector data from and to a sum of the i-th to (i+x−1)-th elements of the input data series in parallel for each of the 0-th to (m−1)-th elements, so as to calculate sums of elements for m sections different from each other in parallel; and calculating a moving average of the input data series from the calculated sums of elements of the sections.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Hereinafter, embodiments will be explained with reference to the drawings.

Figure 15:
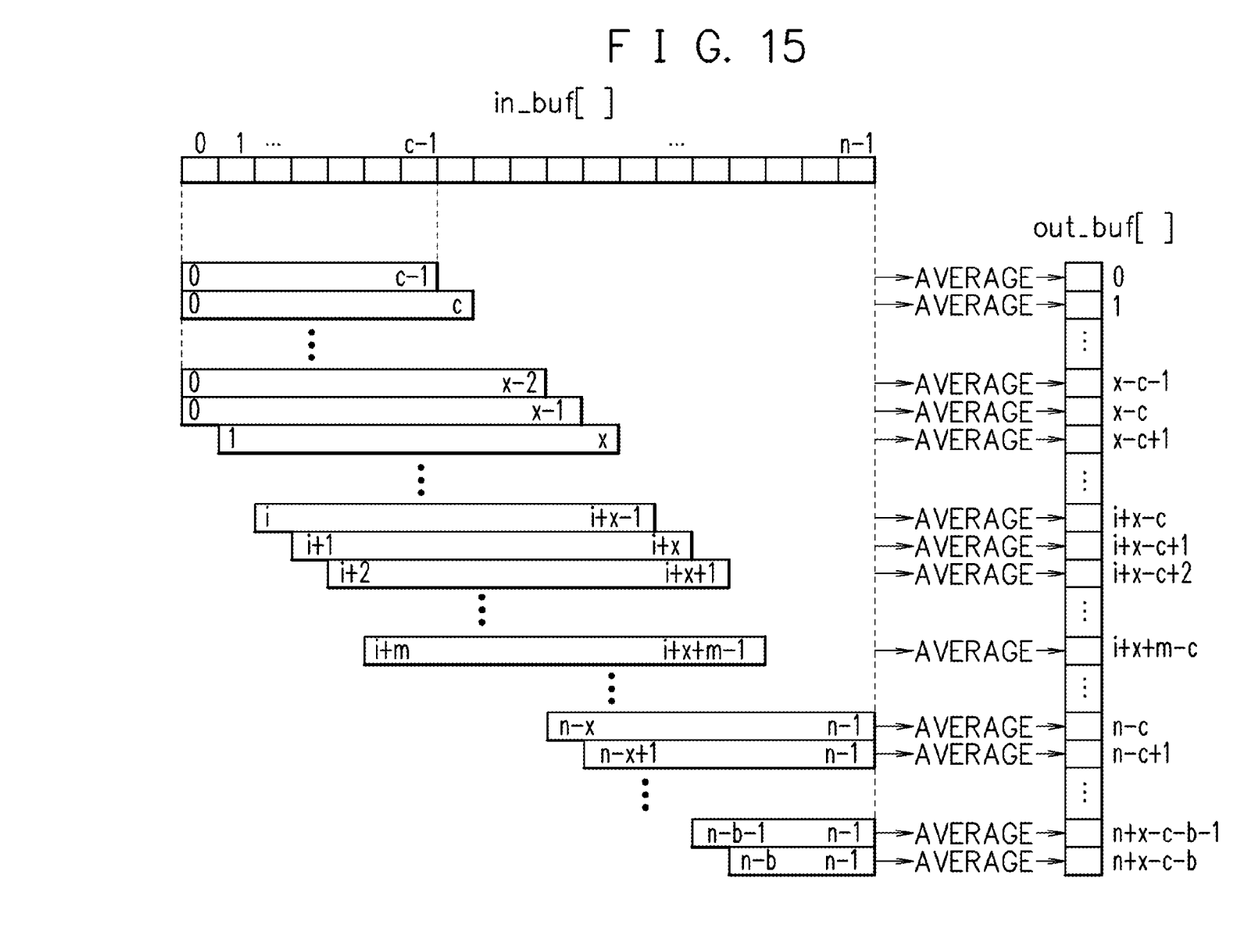
FIG. 15 is a diagram illustrating an example of the moving average processing.

FIG. 15 is a diagram illustrating an example of moving average processing. The moving average processing illustrated in FIG. 15 obtains a moving average for one input data series stored in an input buffer in_buf, and stores the obtained moving average in an output buffer out_buf. A section as the target of moving average differs in a front part, a middle part, and a rear part in the input data series. The number of elements of the section is c in an initial section in the front part, thereafter increases sequentially by 1 at a time until x, is x in the middle part, and decreases by 1 at a time until b in a final section in the rear part.

In the front part in the input data series, the average value of c elements (input data) of the input buffer in_buf[0] to in_buf[c−1] is stored in the output buffer out_buf[0], and the average value of (c+1) elements of the input buffer in_buf[0] to in_buf[c] is stored in the output buffer out_buf[1]. In the front part in the input data series where the number of elements increases, just a new element is added and an oldest element is not subtracted, and a moving average is obtained while increasing the divisor by 1 at a time. The moving average is obtained sequentially in this manner, and the average value of (x−1) elements of the input buffer in_buf[0] to in_buf[x−2] is stored in the output buffer out_buf[x−c−1].

In the middle part in the input data series, the average value of x elements of the input buffer in_buf[0] to in_buf[x−1] is stored in the output buffer out_buf[x−c], and the average value of x elements of the input buffer in_buf[1] to in_buf[x] is stored in the output buffer out_buf[x−c+1]. In the middle part in the input data series, a new element is added and an oldest element is subtracted, and a moving average is obtained by dividing by x. The moving average is obtained sequentially in this manner, and the average value of x elements of the input buffer in_buf[n−x] to in_buf[n−1] is stored in the output buffer out_buf[n−c].

In the rear part in the input data series, the average value of (x−1) elements of the input buffer in_buf[n−x+1] to in_buf[n−1] is stored in the output buffer out_buf[n−c+1]. In the rear part in the input data series where the number of elements decreases, just an oldest element is subtracted and a new element is not added, and a moving average is obtained while decreasing the divisor one by one. The moving average is obtained sequentially in this manner, the average value of (b+1) elements of the input buffer in_buf[n−b−1] to in_buf[n−1] is stored in the output buffer out_buf[n+x−c−b−1], and the average value of b elements of the input buffer in_buf[n−b] to in_buf[n−1] is stored in the output buffer out_buf[n+x−c−b].

Figure 16:
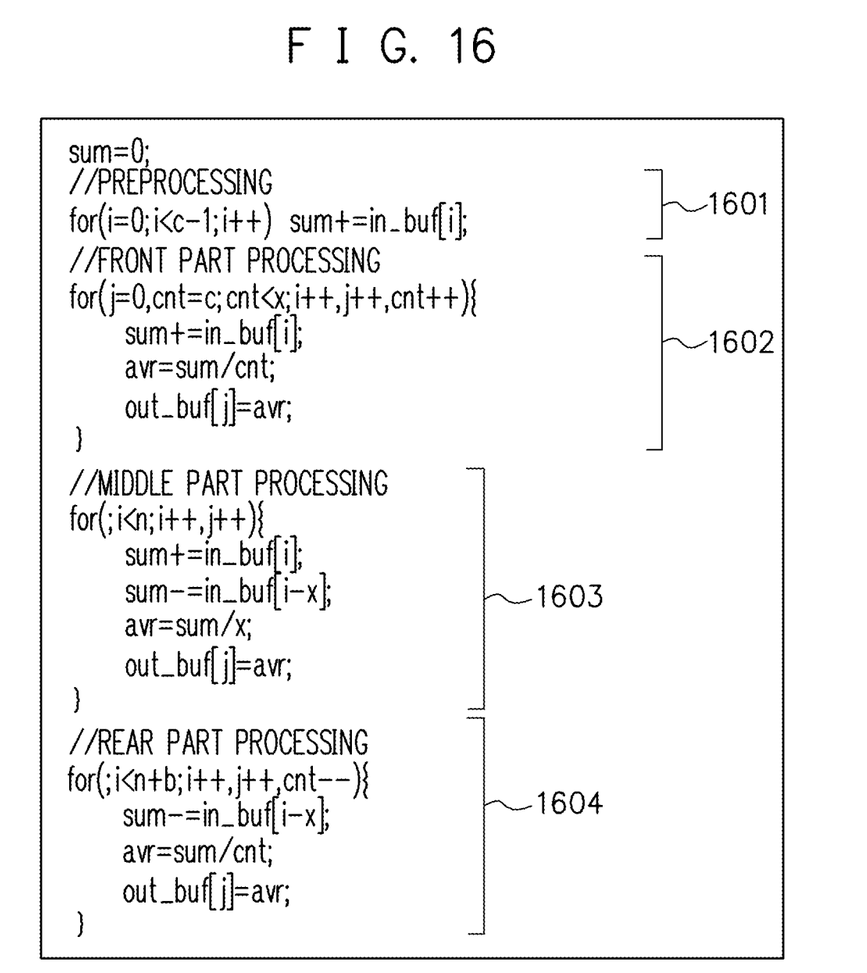
FIG. 16 is a diagram illustrating a program related to the moving average processing illustrated in FIG. 15.

A program example according to the moving average processing illustrated in FIG. 15 is illustrated in FIG. 16. In preprocessing 1601, a total sum value sum is calculated by adding up elements of the input buffer in_buf[0] to input buffer in_buf[c−2]. In front part processing 1602, an average value avr obtained by adding an element of an input buffer in_buf[i] which is a new element to the total sum value sum and thereafter dividing the result by a count value cnt is stored in the output buffer out_buf[j]. In middle part processing 1603, an average value avr obtained by adding the element of the input buffer in_buf[i] which is a new element to the total sum value sum, subtracting the element of the input buffer in_buf[i−x] which is an oldest element therefrom, and thereafter dividing the result by a value x is stored in the output buffer out_buf[j]. In rear part processing 1604, an average value avr obtained by subtracting the element of the input buffer in_buf[i−x] which is an oldest element from the total sum value sum and thereafter dividing the result by the count value cnt is stored in the output buffer out_buf[j].

In the moving average processing as illustrated in FIG. 16, since one new element is added or one oldest element is subtracted to or from the previous arithmetic result, it is difficult to parallelize arithmetic operations, and it is difficult to efficiently process by a SIMD type processor. In an embodiment which will be described below, by separately calculating partial addition processing of an input data series, it is made possible to execute processing related to the moving average processing in parallel, thereby improving processing efficiency.

Figure 1:
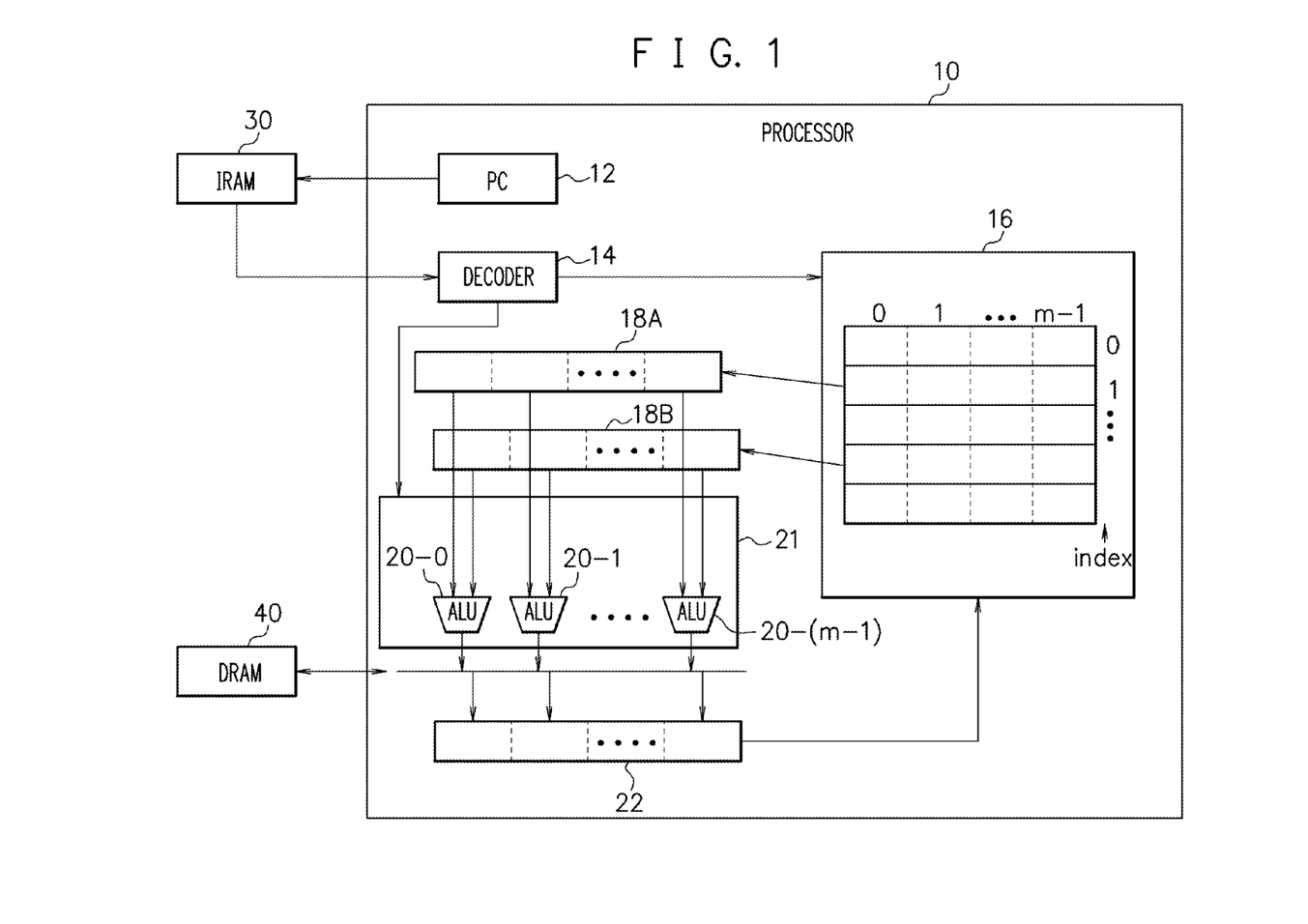
FIG. 1 is a diagram illustrating a structural example of a processor in an embodiment.

FIG. 1 is a diagram illustrating a structural example of a processor in an embodiment. The processor 10 in this embodiment is, for example, a SIMD type processor capable of executing arithmetic operations in parallel. In FIG. 1, a SIMD type processor which parallel processes m pieces of data is presented as an example. The processor 10 includes a program counter (PC) 12, an instruction decoder (DECODER) 14, a SIMD register file 16, SIMD pipeline registers 18A, 18B, 22, and an arithmetic operation unit 21. The arithmetic operation unit 21 includes a plurality of arithmetic units (ALU) 20-0, 20-1, . . . , 20-(m−1).

The processor 10 decodes in the instruction decoder 14 an instruction read from an instruction memory (IRAM) 30 according to the value of the program counter 12. Then, the processor 10 reads data to be used for arithmetic operation from the SIMD register of the register file 16 according to the decode result in the instruction decoder 14, and stores the data in the SIMD pipeline registers 18A, 18B. Data and the like to be used for arithmetic operation are read appropriately from a data memory (DRAM) 40, and are stored in the SIMD register of the register file 16.

The processor 10 uses the data stored in the SIMD pipeline registers 18A, 18B to execute in the arithmetic units 20-0, 20-1, . . . , 20-(m−1) of the arithmetic operation unit 21 arithmetic operations corresponding to the decode result in the instruction decoder 14, and stores arithmetic results in the SIMD pipeline register 22. The arithmetic results stored in the SIMD pipeline register 22 are written in the SIMD register file 16.

Figure 2A:
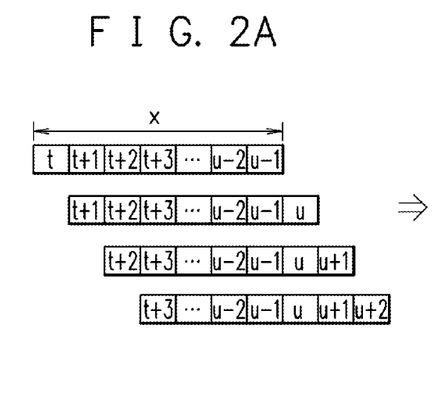
FIG. 2A and FIG. 2B are diagrams for describing parallelization of moving average processing in this embodiment.
Figure 2B:
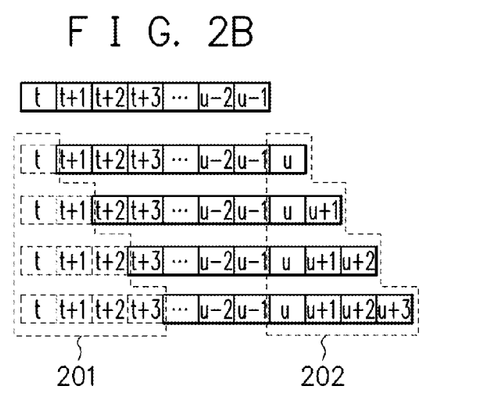

Focusing here on processing to obtain the average value of x elements in the moving average processing of the middle part in the input data series, a calculation to obtain the sum of the x elements includes adding a new element and subtracting an oldest element, as illustrated in FIG. 2A and FIG. 2B. In this embodiment, as illustrated in FIG. 2B, in order to perform m parallel operations to obtain the sum of x elements, a total sum 201 of oldest elements to be subtracted and a total sum 202 of new elements to be added in each operation are calculated separately, and parallelization is performed by using them to obtain the sum of x elements.

FIG. 2A and FIG. 2B are examples of performing the four parallel operations to obtain the sum of x elements, where there are obtained the t-th element, the total sum of t-th and (t+1)-th elements, the total sum of t-th to (t+2)-th elements, and the total sum of t-th to (t+3)-th elements as the total sum 201 of the old elements to be subtracted. Further, there are obtained the u-th element, the total sum of u-th and (u+1)-th elements, the total sum of u-th to (u+2)-th elements, and the total sum of u-th to (u+3)-th elements as the total sum 202 of new elements to be added.

Then, processing to subtract the total sum 201 of old elements and processing to add the total sum 202 of new elements to the total sum of t-th to (u−1)-th elements are performed in parallel, thereby parallelizing calculations to obtain the sum of x elements. In order to obtain the total sum of old elements to be subtracted and the total sum of new elements to be added, in this embodiment, a partial sum instruction which returns a partial sum of 0-th to (m−1)-th elements is provided in a processor capable of parallel processing m pieces of data.

The partial sum instruction is an instruction to calculate a partial sum from m elements (data) stored in a SIMD register vs and stores the result in a SIMD register vr. That is, when the partial sum instruction is executed, the 0-th input element of the SIMD register vs is stored in the SIMD register vr as a 0-th resultant element of vector data, and a result of adding the 0-th and first input elements of the SIMD register vs is stored in the SIMD register vr as a first resultant element of vector data. Further, a result of adding the 0-th to m-th input elements of the SIMD register vs is stored in the SIMD register vr as an m-th resultant element of vector data. That is, by the partial sum instruction, the result of adding the 0-th to k-th (k is an integer) input elements of the SIMD register vs is stored in the SIMD register vr as a k-th resultant element of vector data.

Figure 3A:
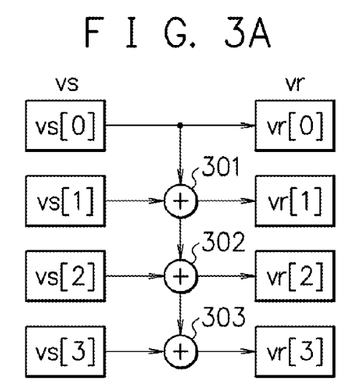
FIG. 3A, FIG. 3B, FIG. 3C are diagrams for describing operations of a partial sum instruction in this embodiment.

FIG. 3A is a diagram illustrating a structural example of an arithmetic circuit which performs arithmetic operations of the partial sum instruction when m=4. The 0-th element vs[0] of the SIMD register vs is inputted to the 0-th element vr[0] of the SIMD register vr. To an adder 301, the 0-th element vs[0] and the first element vs[1] of the SIMD register vs are inputted, and an output thereof is inputted to the first element vr[1] of the SIMD register vr. To an adder 302, the output of the adder 301 and the second element vs[2] of the SIMD register vs are inputted, and an output thereof is inputted to the second element vr[2] of the SIMD register vr. To an adder 303, the output of the adder 302 and the third element vs[3] of the SIMD register vs are inputted, and an output thereof is inputted to the third element vr[3] of the SIMD register vr. Thus, the arithmetic circuit illustrated in FIG. 3A executes arithmetic operations illustrated in FIG. 3B corresponding to the partial sum instruction when m=4.

Figure 3B:
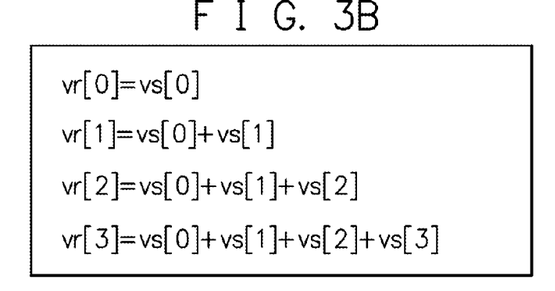
Figure 3C:
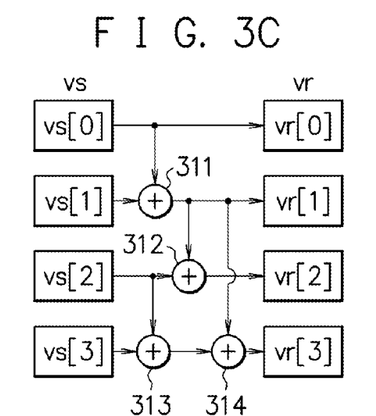

Note that the structure of the arithmetic circuit which performs the arithmetic operations of the partial sum instruction is not limited to the circuit illustrated in FIG. 3A, and may be any circuit structure as long as it is capable of executing the arithmetic operations illustrated in FIG. 3B. For example, it may be a circuit as illustrated in FIG. 3C. FIG. 3C is a diagram illustrating another structural example of an arithmetic circuit which performs the arithmetic operations of the partial sum instruction when m=4. The 0-th element vs[0] of the SIMD register vs is inputted to the 0-th element vr[0] of the SIMD register vr. To an adder 311, the 0-th element vs[0] and the first element vs[1] of the SIMD register vs are inputted. An output of the adder 311 is inputted to the first element vr[1] of the SIMD register vr. To an adder 312, the output of the adder 311 and the second element vs[2] of the SIMD register vs are inputted. An output of the adder 312 is inputted to the second element vr[2] of the SIMD register vr. To an adder 313, the second element vs[2] and the third element vs[3] of the SIMD register vs are inputted. To an adder 314, the output of the adder 311 and an output of the adder 313 are inputted. An output of the adder 314 is inputted to the third element vr[3] of the SIMD register vr. In the circuit structure illustrated in FIG. 3C, the number of stages of addition related to the arithmetic operations of the partial sum instruction can be reduced.

Figure 4:
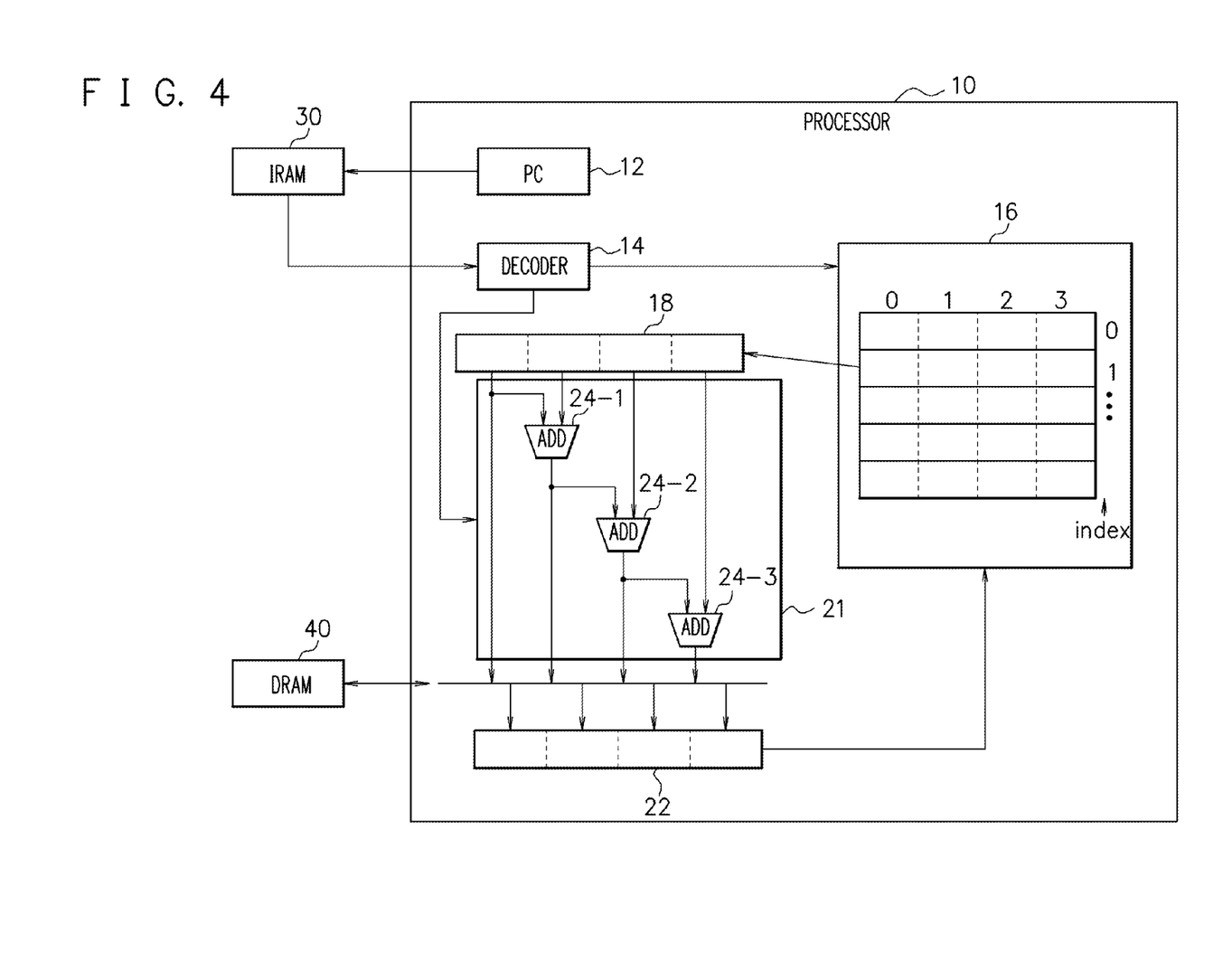
FIG. 4 is a schematic diagram illustrating the processor when executing the partial sum instruction in this embodiment.
Figure 5A:
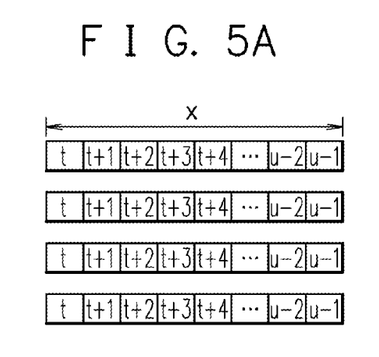
FIG. 5A to FIG. 5F are diagrams illustrating an example of moving average processing (middle part processing) in this embodiment.
Figure 5B:
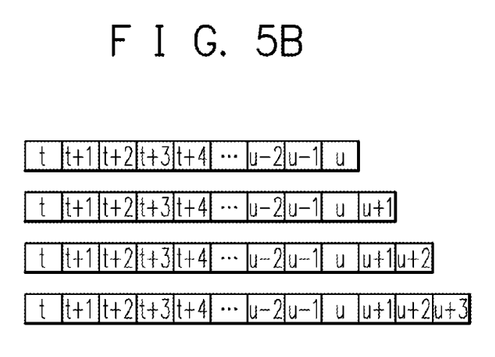
Figure 5C:
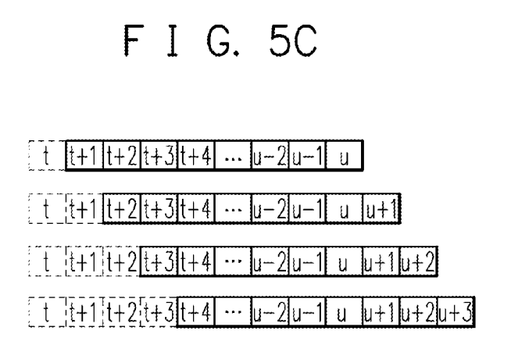
Figure 5D:
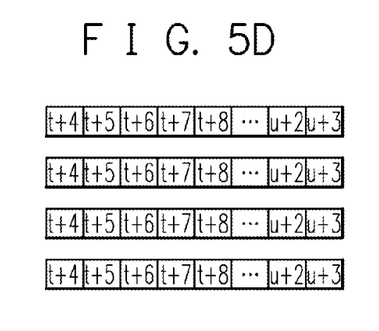
Figure 5E:
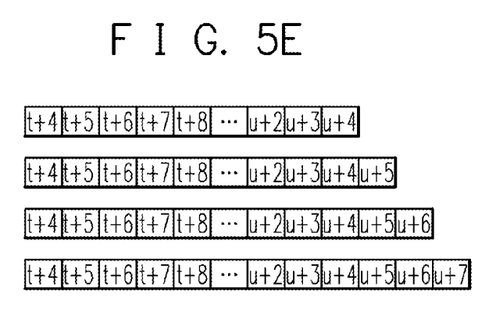
Figure 5F:
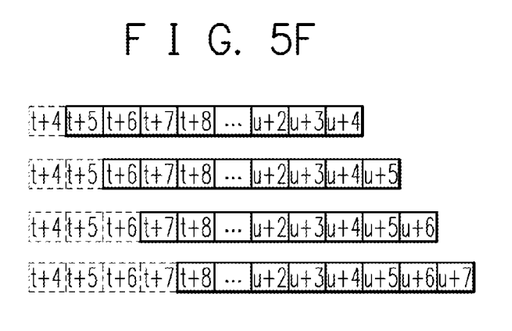

FIG. 4 is a schematic diagram illustrating the processor when executing the partial sum instruction in this embodiment. Also FIG. 4 illustrates the processor when executing the partial sum instruction when m=4 as an example. In FIG. 4, the same numerals are given to structural elements having the same function as the structural elements illustrated in FIG. 1, and duplicating descriptions are omitted. A plurality of arithmetic units included in an arithmetic operation unit 21 realize a plurality of adders (ADD) 24-1, 24-2, 24-3.

The 0-th element of the SIMD pipeline register 18 is inputted as the 0-th element of the SIMD pipeline register 22. The first element and 0-th element of the SIMD pipeline register 18 are inputted to the adder 24-1, and an output of the adder 24-1 is inputted as the first element of the SIMD pipeline register 22. The second element of the SIMD pipeline register 18 and the output of the adder 24-1 are inputted to the adder 24-2, and an output of the adder 24-2 is inputted as the second element of the SIMD pipeline register 22. The third element of the SIMD pipeline register 18 and the output of the adder 24-2 are inputted to the adder 24-3, and an output of the adder 24-3 is inputted as the third element of the SIMD pipeline register 22. Note that in FIG. 4, three-stage addition processing is performed in the arithmetic operation unit 21, but it can be executed by one cycle.

Figure 17:
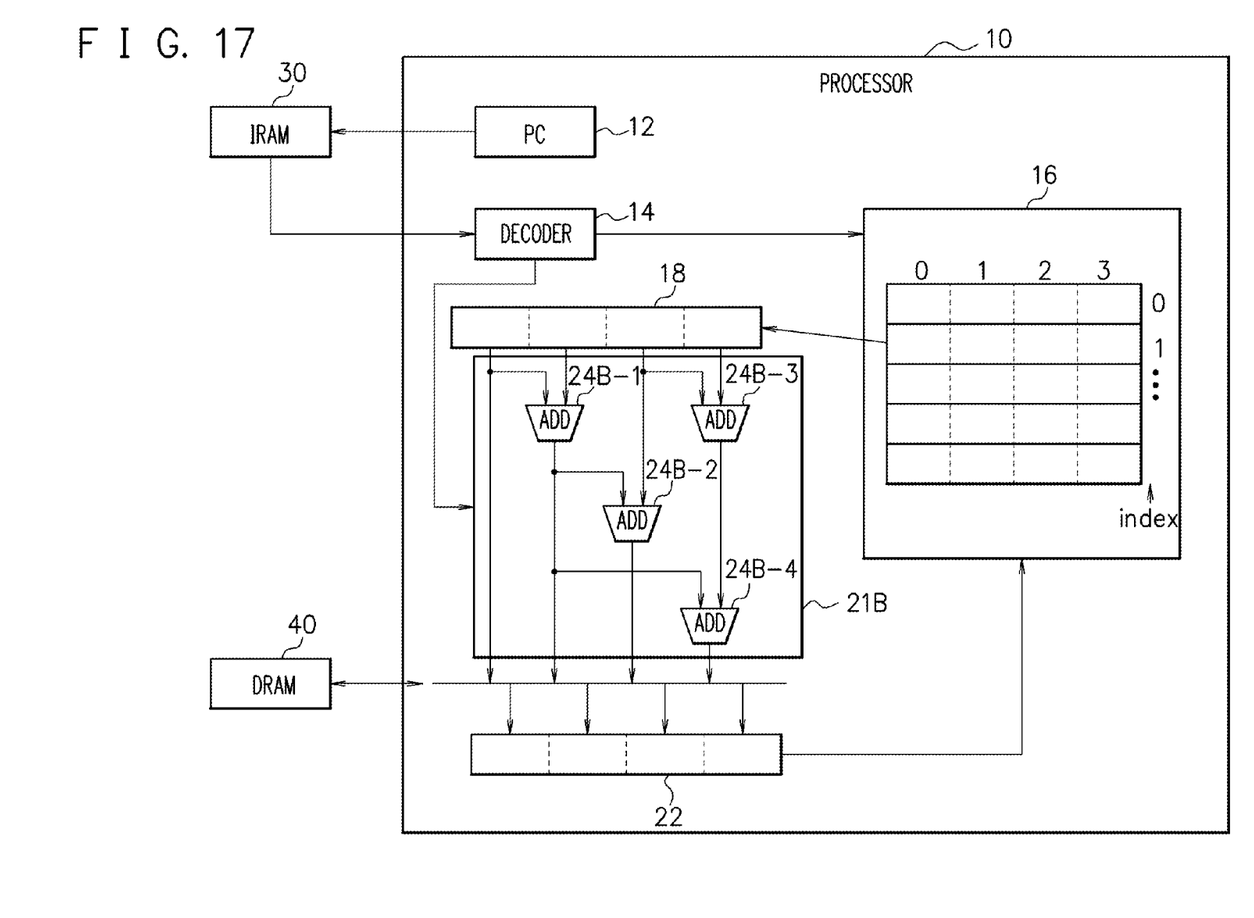
FIG. 17 is a schematic diagram illustrating another example of the processor when executing the partial sum instruction in this embodiment.

FIG. 17 is a schematic diagram illustrating another example of the processor when executing the partial sum instruction in this embodiment. Also FIG. 17 illustrates the processor when executing the partial sum instruction when m=4 as an example, and corresponds to an example of performing the arithmetic operations of the partial sum instruction as illustrated in FIG. 3C. In FIG. 17, the same numerals are given to structural elements having the same function as the structural elements illustrated in FIG. 1 and FIG. 4, and duplicating descriptions are omitted. A plurality of arithmetic units included in an arithmetic operation unit 21B realize a plurality of adders (ADD) 24B-1, 24B-2, 24B-3, 24B-4.

The 0-th element of the SIMD pipeline register 18 is inputted as the 0-th element of the SIMD pipeline register 22. The first element and 0-th element of the SIMD pipeline register 18 are inputted to the adder 24B-1, and an output of the adder 24B-1 is inputted as the first element of the SIMD pipeline register 22. The second element of the SIMD pipeline register 18 and the output of the adder 24B-1 are inputted to the adder 24B-2, and an output of the adder 24B-2 is inputted as the second element of the SIMD pipeline register 22. The third element and the second element of the SIMD pipeline register 18 are inputted to the adder 24B-3. The output of the adder 24B-1 and an output of the adder 24B-3 are inputted to the adder 24B-4, and an output of the adder 24B-4 is inputted as the third element of the SIMD pipeline register 22. Note that also in FIG. 17, the addition processing in the arithmetic operation unit 21 can be executed by one cycle.

FIG. 5A to FIG. 5F are diagrams illustrating an example of the moving average processing (middle part processing) in this embodiment, and illustrate the case of m=4 (4 parallel operations) as an example. The processor 10 obtains a partial sum of t-th to (t+3)-th elements and a partial sum of u-th to (u+3)-th elements by the partial sum instruction. Then, illustrated as FIG. 5B, the processor 10 adds the partial sum of u-th to (u+3)-th elements obtained by the partial sum instruction to the total sum of t-th to (u−1)-th elements which is an arithmetic result of the last element in previous one illustrated in FIG. 5A. Moreover, illustrated as FIG. 5C, the processor 10 subtracts the partial sum of t-th to (t+3)-th elements obtained by the partial sum instruction from the result of addition illustrated in FIG. 5B. Thus, the operation to obtain the total sum of (t+1)-th to u-th elements, the operation to obtain the total sum of (t+2)-th to (u+1)-th elements, the operation to obtain the total sum of (t+3)-th to (u+2)-th elements, and the operation to obtain the total sum of (t+4)-th to (u+3)-th elements can be executed in parallel.

Similarly, the processor 10 obtains a partial sum of (t+4)-th to (t+7)-th elements and a partial sum of (u+4)-th to (u+7)-th elements by the partial sum instruction. Then, illustrated as FIG. 5E, the processor 10 adds the partial sum of (u+4)-th to (u+7)-th elements obtained by the partial sum instruction to the total sum of (t+4)-th to (u+3)-th elements which is an arithmetic result of the last element in previous one (FIG. 5C) illustrated in FIG. 5D. Moreover, illustrated as FIG. 5F, the processor 10 subtracts the partial sum of (t+4)-th to (t+7)-th elements obtained by the partial sum instruction from the result of addition illustrated in FIG. 5E. Thus, the operation to obtain the total sum of (t+5)-th to (u+4)-th elements, the operation to obtain the total sum of (t+6)-th to (u+5)-th elements, the operation to obtain the total sum of (t+7)-th to (u+6)-th elements, and the operation to obtain the total sum of (t+8)-th to (u+7)-th elements can be executed in parallel.

When the 4 parallel operations to obtain the total sum of elements as illustrated in FIG. 5A to FIG. 5F are executed for example, the processing efficiency in the middle part processing becomes four times higher. Note that although FIG. 5A to FIG. 5F presented an example of adding the partial sum of new elements to the arithmetic result of previous one and thereafter subtracting the partial sum of old elements therefrom, it may also be such that the partial sum of old elements is subtracted from the arithmetic result of previous one and thereafter the partial sum of new elements is added thereto.

Figure 6:
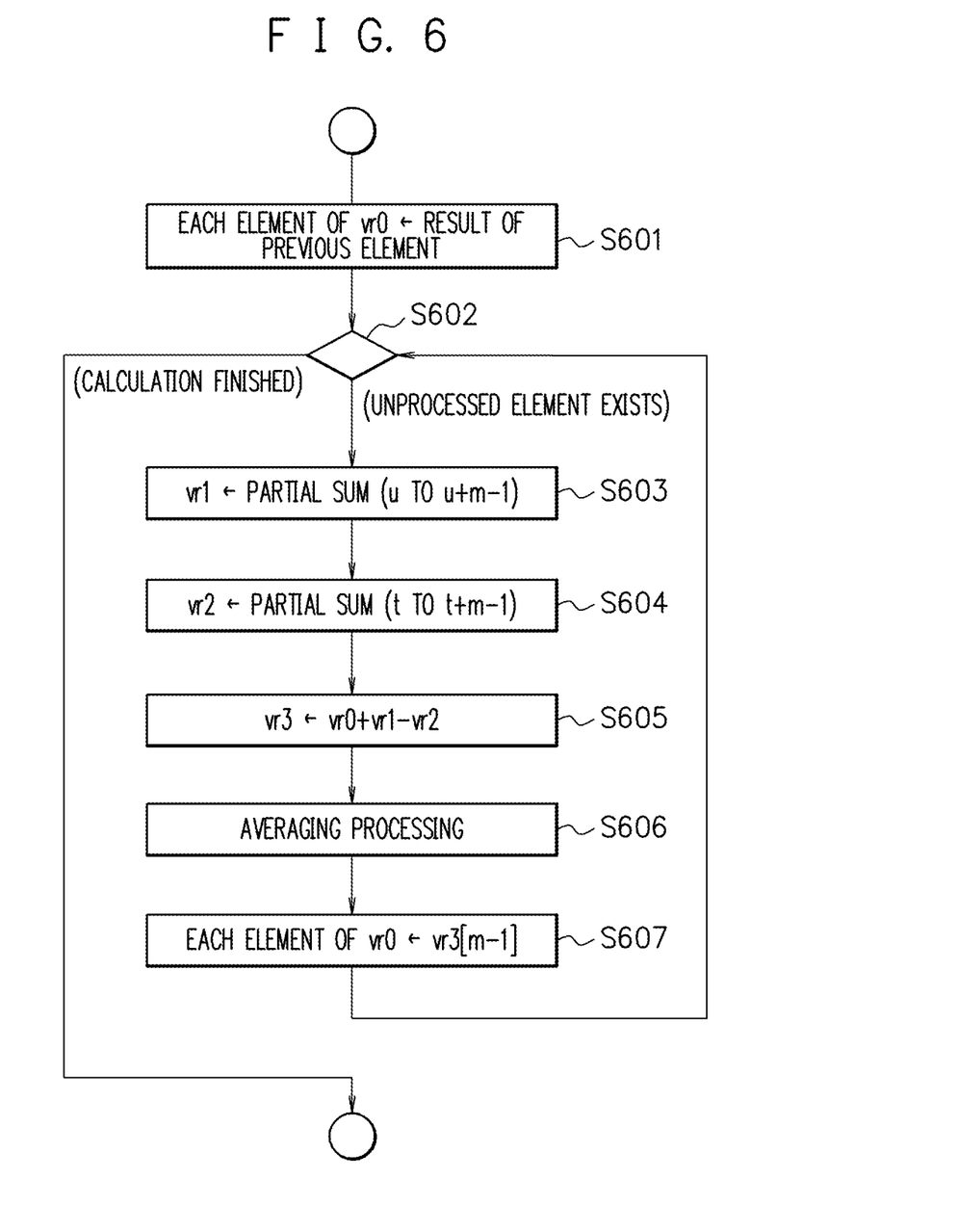
FIG. 6 is a flowchart illustrating the moving average processing (middle part processing) in this embodiment.

FIG. 6 is a flowchart illustrating the moving average processing (middle part processing) in this embodiment. When the front part processing is finished and the processor proceeds to the middle part processing, in step S601, the processor 10 inputs the arithmetic result of a last element in the front part processing to each element vr0[0] to vr0[m−1] of the SIMD register vr0. Next, in step S602, the processor 10 determines whether any unprocessed element exists or not among the elements to be processed in the middle part processing. As a result, when no unprocessed part exists, the calculation related to the middle part processing is finished, and the processor proceeds to rear part processing. On the other hand, when any unprocessed part exists, the processor proceeds to step S603.

In step S603, the processor 10 executes the partial sum instruction to obtain the partial sum of u-th to (u+m−1)-th new elements to be added, and inputs them to respective elements vr1[0] to vr1[m−1] of a SIMD register vr1. Further, in step S604, the processor 10 executes the partial sum instruction to obtain the partial sum of t-th to (t+m−1)-th old elements to be subtracted, and inputs them to respective elements vr2[0] to vr2[m−1] of a SIMD register vr2. Note that the order of processing of step S603 and step S604 is arbitrary.

Next, in step S605, for every corresponding element, the processor 10 performs processing to add the SIMD register vr1 and subtract the SIMD register vr2 to and from the SIMD register vr0, and inputs the arithmetic result to respective elements vr3[0] to vr3[m−1] of a SIMD register vr3. Subsequently, in step S606, the processor 10 performs averaging processing corresponding to the number of elements contained in the section on the respective elements vr3[0] to vr3[m−1] of the SIMD register vr3 to calculate an average value, and writes the result in a certain memory area. Then, in step S607, the processor 10 inputs the last element vr3[m−1] of the SIMD register vr3 to respective elements vr0[0] to vr0[m−1] of a SIMD register vr0, and returns to step S602.

As described above, in the processor capable of parallel processing m pieces of data, by providing the partial sum instruction which returns a partial sum of partial 0-th to (m−1)-th elements of an input data series, an operation to obtain a sum of elements in a section in the moving average processing can be executed in parallel. This makes it possible to perform processing related to the moving average processing in parallel to improve processing efficiency, and it becomes possible to efficiently process the moving average processing in the SIMD type processor for example.

Here, in the moving average processing as illustrated in FIG. 15, the number of elements in a section varies in the front part, the middle part, and the rear part in the input data series. Accordingly, the conditional branch as illustrated in FIG. 16 occurs, and each loop processing becomes small making an overhead related to loop control become large, thereby decreasing processing efficiency. Accordingly, in this embodiment, in order to allow execution of arithmetic operations with the number of elements in each section being x, the input buffer in_buf and the output buffer out_buf are virtually expanded as illustrated in FIG. 7, so as to further improve processing efficiency related to the moving average processing.

Figure 7:
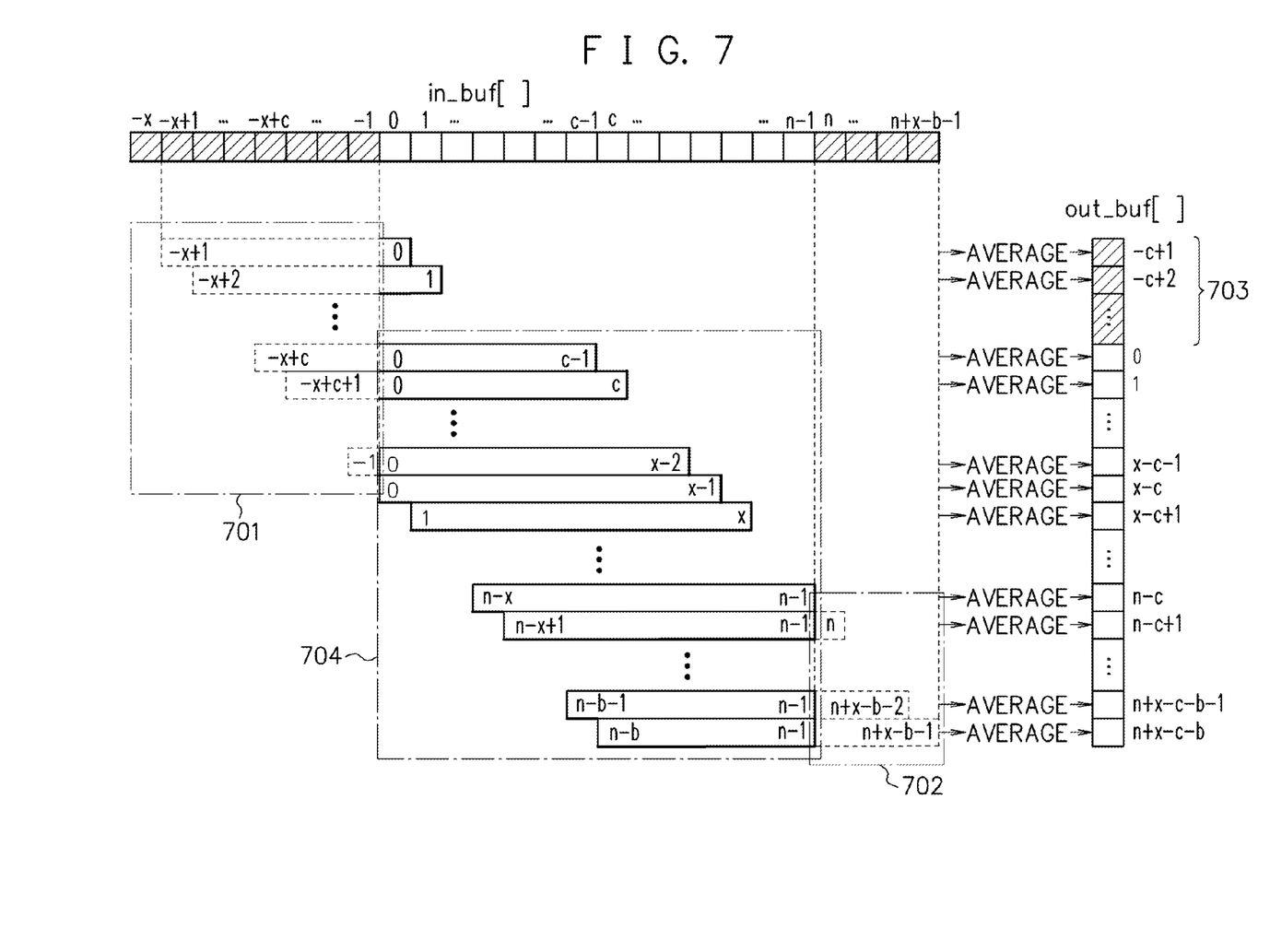
FIG. 7 is a diagram illustrating an example of the moving average processing in this embodiment.

FIG. 7 is a diagram illustrating an example of the moving average processing in this embodiment. The array of the input buffer in_buf is virtually expanded to an index of (−x) on the negative side, and the array of the input buffer in_buf is virtually expanded to an index of (n+x−b−1) on the positive side. Further, the array of the output buffer out_buf is expanded virtually to an index of (−c+1) on the negative side.

In this manner, by virtually expanding the array of the input buffer in_buf, the number of elements in a section in the moving average processing in the front part, the middle part, and the rear part in the input data series can be uniformed to x. Further, by virtually expanding the array of the output buffer out_buf, also preprocessing can be executed by processing similar to normal processing to obtain an average value in each section. Therefore, the conditional branch in the moving average processing is eliminated, and it becomes possible to execute the moving average processing by one loop processing. Thus, processing efficiency related to moving average processing can be improved.

Here, regarding the negative index in the array of the expanded input buffer in_buf, that is, the (−x)-th to (−1)-th elements of the input buffer in_buf, reading is suppressed to 0 (zero) by a masked load instruction. Similarly, regarding the index of n or more in the expanded input buffer in_buf, that is, the n-th to (n+x−b−1)-th elements of the input buffer in_buf, reading is suppressed to 0 by a masked load instruction. Further, regarding the negative index in the array of the expanded output buffer out_buf, that is, the (−c+1)-th to (−1)-th elements of the output buffer out_buf, writing is suppressed by a masked store instruction.

The masked load instruction stores 0 when the value of the x-th bit from the high-order side of a mask register mr is 0, or stores load data when the value is 1, in the x-th element of the SIMD register. The masked store instruction performs store processing of the x-th element of the SIMD register only when the value of the x-th bit from the high-order side of the mask register mr is 1 (does nothing when the value is 0). Note that in this embodiment, in the mask register mr of m bit, the most significant bit is the 0-th bit and the least significant bit is the (m−1)-th bit.

Figure 8A:
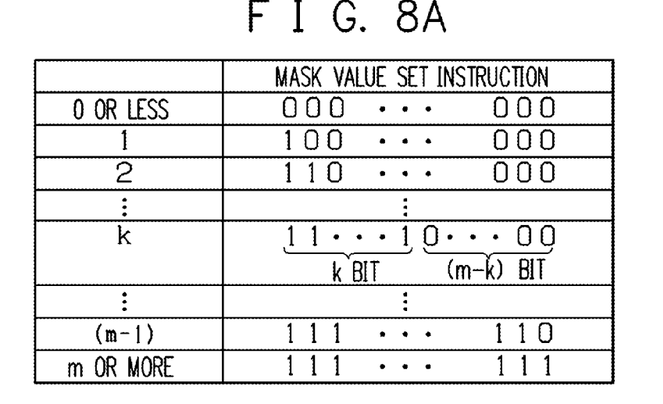
FIG. 8A and FIG. 8B are diagrams for describing a mask value set instruction in this embodiment.

A mask value set instruction and a mask value set instruction_R which set a value in the mask register mr will be described. FIG. 8A is a diagram for describing a mask value set instruction. When the value is k(0<k<m), the mask value set instruction sets the values from the 0-th bit to (k−1)-th bit of the mask register mr to 1, and sets the k-th bit to (m−1)-th bit to 0. That is, when the value is k, the mask value set instruction sets the values of k bits from the high-order side of the mask register mr to 1 and sets the values of remaining (m−k) bits to 0. The mask value set instruction sets the values of all the bits of the mask register mr to 0 when the value is 0 or less, and sets the values of all the bits of the mask register mr to 1 when the value is m or more.

Figure 8B:
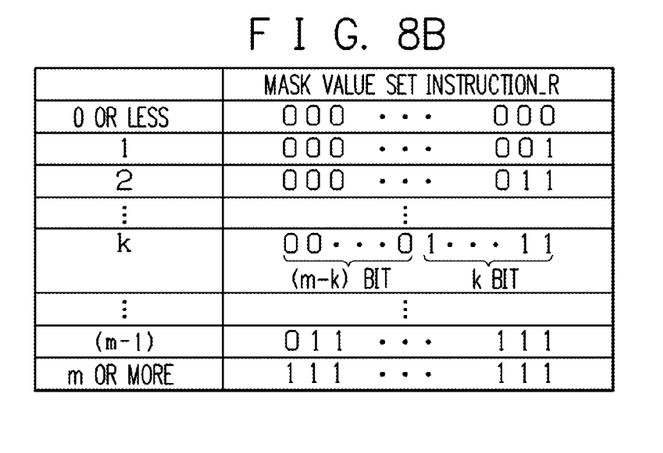

FIG. 8B is a diagram for describing a mask value set instruction R. When the value is k(0<k<m), the mask value set instruction R sets the values from the 0-th bit to (m−k−1)-th bit of the mask register mr to 0, and sets the (m−k)-th bit to (m−1)-th bit to 1. That is, when the value is k, the mask value set instruction R sets the values of k bits from the low-order side of the mask register mr to 1 and sets the values of remaining (m−k) bits to 0. The mask value set instruction R sets the values of all the bits of the mask register mr to 0 when the value is 0 or less, and sets the values of all the bits of the mask register mr to 1 when the value is m or more.

Figure 9:
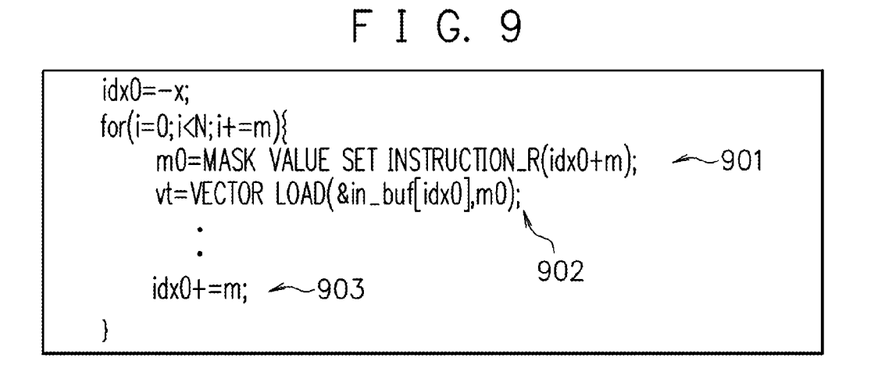
FIG. 9 is a diagram illustrating an example of a program related to load processing in the moving average processing in this embodiment.

For example, by a program illustrated in FIG. 9, the elements corresponding to the (−x)-th to (−1)-th elements of the input buffer in_buf included in a region 701 illustrated in FIG. 7 are set to 0. In FIG. 9, processing of code 901 sets the mask value corresponding to a value (idx0+m) to the mask register m0 by the mask value set instruction R. Processing of code 902 loads the elements corresponding to the (idx0)-th to (idx0+m−1)-th elements of the input buffer in_buf according to the value of the mask register m0 and stores them in a SIMD register vt. Processing of code 903 adds m to the value idx0 to make it a new idx0. By executing this program illustrated in FIG. 9, the elements corresponding to the (−x)-th to (−1)-th elements of the input buffer in_buf are set to 0, and the elements corresponding to the 0-th element and thereafter of the input buffer in_buf are loaded and stored in the SIMD register vt.

Figure 10:
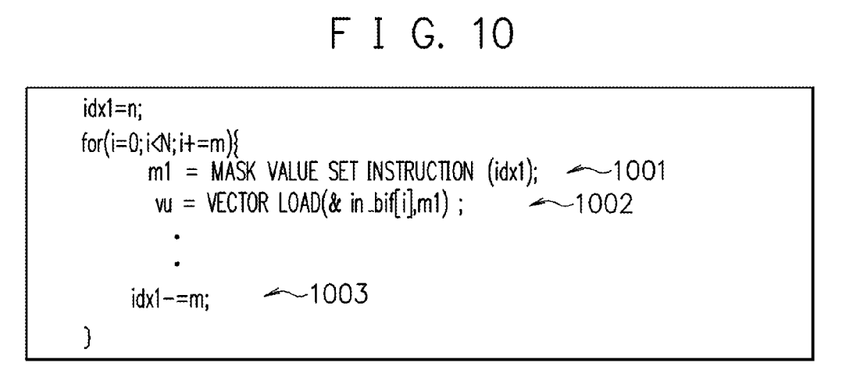
FIG. 10 is a diagram illustrating an example of a program related to the load processing in the moving average processing in this embodiment.

By a program illustrated in FIG. 10, the elements corresponding to the n-th to (n+x-b-1)-th elements of the input buffer in_buf included in a region 702 illustrated in FIG. 7 are set to 0. In FIG. 10, processing of code 1001 sets the mask value corresponding to a value (idx1) to the mask register m1 by the mask value set instruction. Processing of code 1002 loads the elements corresponding to the i-th to (i+m−1)-th elements of the input buffer in_buf according to the value of the mask register m1 and stores them in a SIMD register vu. Processing of code 1003 subtracts m from the value idx1 to make it a new idx1. By executing this program illustrated in FIG. 10, the elements corresponding to the n-th element and thereafter of the input buffer in_buf are set to 0, and the elements corresponding to the 0-th to (n−1)-th elements of the input buffer in_buf are loaded and stored in the SIMD register vu.

Figure 11:
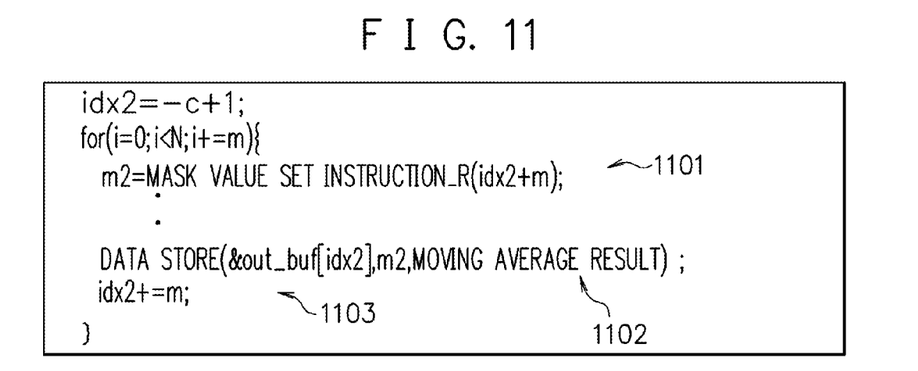
FIG. 11 is a diagram illustrating an example of a program related to store processing in the moving average processing in this embodiment.

By a program illustrated in FIG. 11, store processing of the elements corresponding to the (−c+1)-th to (−1)-th elements of the output buffer out_buf included in a region 703 illustrated in FIG. 7 is suppressed. In FIG. 11, processing of code 1101 sets the mask value corresponding to a value (idx2+m) to the mask register m2 by the mask value set instruction R. Processing of code 1102 performs store processing of storing the moving average results in the elements corresponding to the (idx2)-th to (idx2+m−1)-th elements of the output buffer Out_buf according to the value of the mask register m2. Processing of code 1103 adds m to the value idx2 to make it a new idx2. By executing this program illustrated in FIG. 11, there are performed store processing related to the elements corresponding to the (−c+1)-th to the (−1)-th elements of the output buffer out_buf is suppressed, and store processing of arithmetic results is performed for the elements corresponding to the 0-th element and thereafter of the output buffer out_buf.

In the moving average processing, averaging processing for calculating an average value is performed, but when this averaging processing is performed by division, the number of cycles needed for the processing becomes large. Further, the number of effective elements differs in the front part, the middle part, and the rear part in the input data series. Accordingly, in this embodiment, a coefficient table storing inverse numbers of divisors for obtaining an average value is provided. Then, processing efficiency is improved by calculating an average value by multiplying the inverse number of the divisor corresponding to a value i obtained from the coefficient table and the total sum of elements in a section.

Figure 12:
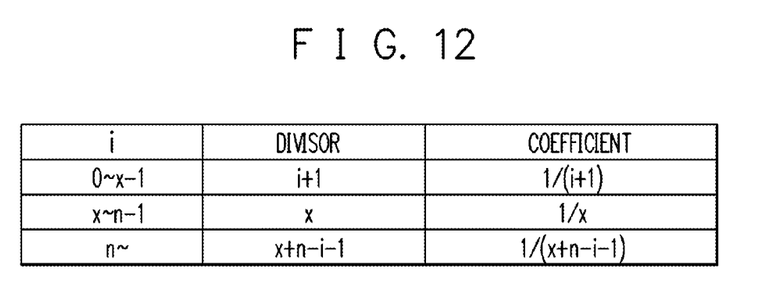
FIG. 12 is a diagram for describing a coefficient table in this embodiment.

FIG. 12 is a diagram illustrating divisors and inverse numbers thereof corresponding to values i stored in the coefficient table in this embodiment. When the value i is 0 to (x−1), it corresponds to the front part (including preprocessing) in the input data series, and the number of effective elements, that is, the divisor is (i+1), and the inverse number thereof is 1/(i+1). When the value i is x to (n−1), it corresponds to the middle part in the input data series, and the number of effective elements, that is, the divisor is x, and the inverse number thereof is 1/x. When the value i is larger than n, it corresponds to the rear part in the input data series, and the number of effective elements, that is, the divisor is (x+n−i−1), and the inverse number thereof is 1/(x+n−i−1).

Figure 13:
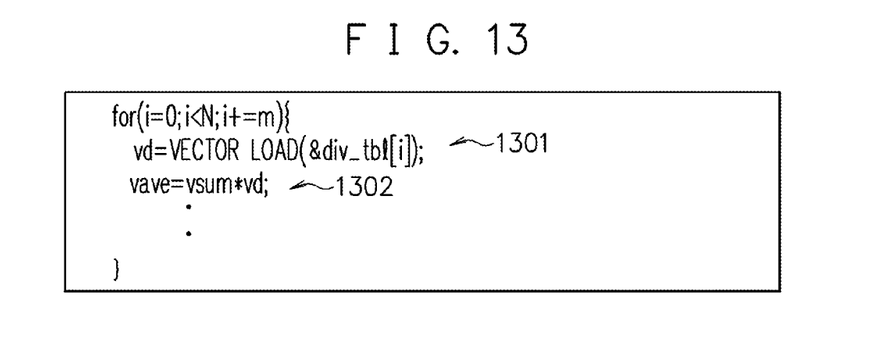
FIG. 13 is a diagram illustrating an example of a program related to averaging processing in the moving average processing in this embodiment.

Therefore, an average value can be calculated by creating a coefficient table div_tbl storing the inverse numbers corresponding to the values i illustrated in FIG. 12 as i-th elements, and obtaining the inverse number corresponding to a value i from the coefficient table div_tbl and multiplying the inverse number by the total sum of elements in a section by a program illustrated in FIG. 13. In FIG. 13, processing of code 1301 loads the i-th to (i+m−1)-th elements of the coefficient table div_tbl and stores them in a SIMD register vd. For every corresponding element, processing of code 1302 stores in a SIMD register vane an average value obtained by multiplying the total sum of elements of a section stored in a SIMD register vsum and a value stored in the SIMD register vd.

Figure 14:
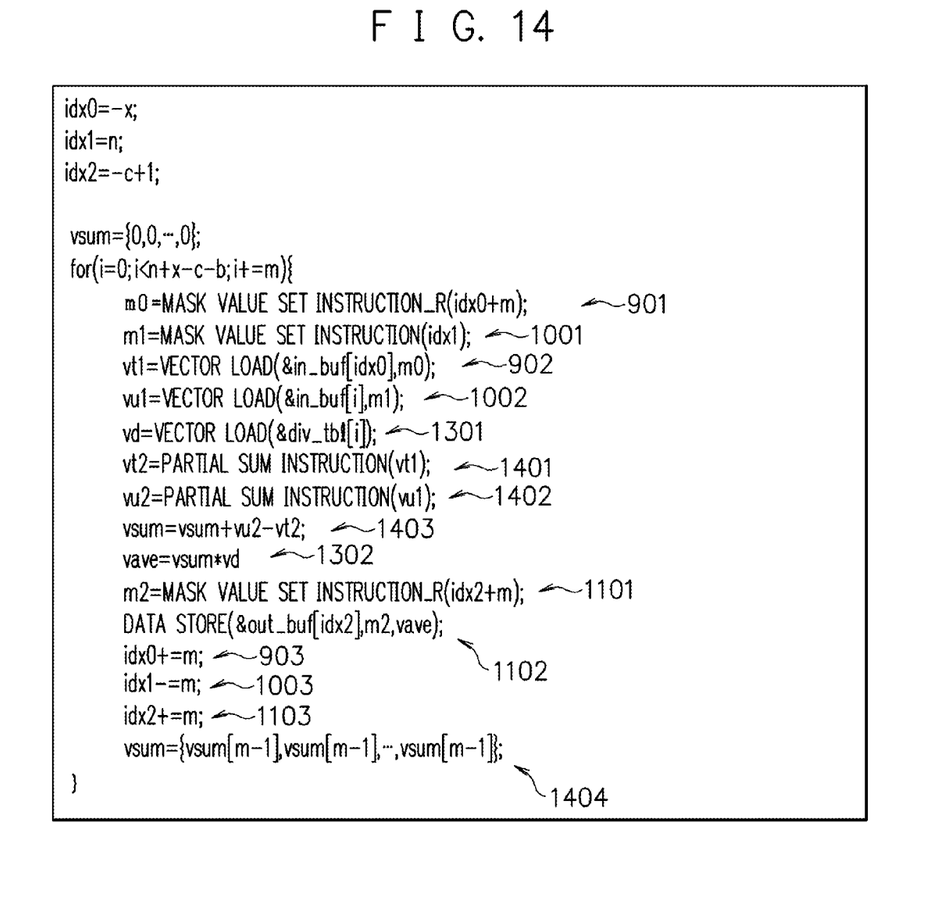
FIG. 14 is a diagram illustrating an example of a program related to the moving average processing in this embodiment.

FIG. 14 illustrates an example of a program related to the moving average processing in this embodiment to which the above-described processing is applied. In this FIG. 14, the same reference numerals are given to the same components as the components illustrated in FIG. 9 to FIG. 11 and FIG. 13, and duplicating descriptions are omitted. Note that in FIG. 14, the SIMD register which stores a partial sum to be subtracted when the total sum of elements of a section is obtained is vt2, and the SIMD register which stores load data from the input buffer in_buf for obtaining this partial sum is vt1. The SIMD register which stores a partial sum to be added when the total sum of elements of a section is obtained is vu2, and the SIMD register which stores load data from the input buffer in_buf for obtaining this partial sum is vu1.

In FIG. 14, processing of code 1401 calculates a partial sum based on a value stored in the SIMD register vt1 by the partial sum instruction and stores it in the SIMD register vt2. Further, processing of code 1402 calculates a partial sum based on a value stored in the SIMD register vu1 by the partial sum instruction and stores it in the SIMD register vu2. For every corresponding element, processing of code 1403 adds the value of the SIMD register vu2 to the value of the SIMD register vsum, and subtracts the value of the SIMD register vt2 therefrom, so as to calculate the total sum of elements of the section and stores (overwrites) the result in the SIMD register vsum. Processing of code 1404 stores (overwrites) the last element vsum[m−1] of the SIMD register vsum in each element of the SIMD register vsum.

The disclosed moving average processing can improve processing efficiency by executing processing related to the moving average processing in parallel by separately calculating partial addition processing of an input data series.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium storing a program for causing a processor, which executes m number of arithmetic operations in parallel, m being an integer of 2 or more, and executes based on 0-th to (m−1)-th input elements a partial sum instruction which calculates a sum of the 0-th to p-th input elements and returns each as a p-th resultant element, p being an integer of 0 to m−1, to execute a moving average process comprising:
   executing the partial sum instruction which takes an i-th to (i+m−1)-th elements of an input data series as the 0-th to (m−1)-th input elements, so as to obtain first vector data, i being an arbitrary number among 0 and natural numbers;
   executing the partial sum instruction which takes a (i+x)-th to (i+x+m−1)-th elements of the input data series as the 0-th to (m−1)-th input elements, so as to obtain second vector data, x being a natural number;
   performing operations to subtract the p-th element of the first vector data and add the p-th element of the second vector data from and to a sum of the i-th to (i+x−1)-th elements of the input data series in parallel for each of the 0-th to (m−1)-th elements, so as to calculate sums of elements for m sections different from each other in parallel; and
   calculating a moving average of the input data series from the calculated sums of elements of the sections.

2. The computer readable recording medium according to claim 1, wherein
   the executing the partial sum instruction to obtain the first vector data, the executing the partial sum instruction to obtain the second vector data, the performing operations to calculate sums of elements for m sections, and the calculating a moving average of the input data series are executed as one group repeatedly while increasing the value i by m at a time; and
   the sum of the (i+m)-th to (i+x+m−1)-th elements in the performing operations to calculate sums of elements for m sections of a previous group is taken as the sum of the i-th to (i+x−1)-th elements of the input data series in the performing operations to calculate sums of elements for m sections of a next group, so as to perform the arithmetic operations.

3. The computer readable recording medium according to claim 2, wherein
   the input data series includes 0-th to (n−1)-th elements, n being an integer of 2 or more, and
   the input data series is expanded so that the number of elements in each section is x, so as to calculate the moving average.

4. The computer readable recording medium according to claim 3, wherein a mask bit corresponding to the 0-th to (n−1)-th elements of the input data series is generated, and
   load processing and store processing of data of the elements corresponding to the mask bit are performed.

5. The computer readable recording medium according to claim 4, wherein
   the input data series is expanded to an (−x)-th element, and the load processing of elements is suppressed by the mask bit for the (−x)-th to (−1)-th elements of the input data series.

6. The computer readable recording medium according to claim 4, wherein
   when the number of elements of a last section for which the moving average is obtained is b, b being an arbitrary integer of x or less, the input data series is expanded to a (n+x−b−1)-th element, and the load processing of the n-th to (n+x−b−1)-th elements of the input data series is suppressed.

7. The computer readable recording medium according to claim 4, wherein
   when the number of elements of an initial section for which the moving average is obtained is c, c being an arbitrary integer of x or less, a series of the output buffer is expanded to the (−c+1)-th element, and
   the store processing of (−c+1)-th to (−1)-th elements of the series of the output buffer is suppressed.

8. The computer readable recording medium according to claim 4, wherein the processor is a SIMD type processor.

9. The computer readable recording medium according to claim 3, wherein an output buffer storing calculated moving averages is expanded according to the expansion of the input data series.

10. The computer readable recording medium according to claim 1, wherein a moving average is calculated by multiplying a result of the performing operations to calculate sums of elements for m sections and an inverse number obtained by referring to a coefficient table storing inverse numbers of numbers of effective elements of each section for which the moving average is calculated in the calculating a moving average of the input data series.

11. A processor comprising:
an arithmetic operation unit which calculates moving averages of an input data series in parallel for a plurality of sections, wherein
the arithmetic operation unit executes:
a first arithmetic operation to calculate, for each element of a first SIMD register, a sum of an i-th to (i+p)-th elements of the input data series and store the sum as a p-th element in the first SIMD register, i being an arbitrary number among 0 and natural numbers, p being an integer of 0 to m−1, and m being an integer of 2 or more;
a second arithmetic operation to calculate, for each element of a second SIMD register, a sum of an (i+x)-th to (i+x+p)-th elements of the input data series and store the sum as a p-th element in the second SIMD register, x being a natural number; and
a third arithmetic operation to perform operations to add the p-th element of the second SIMD register and subtract the p-th element of the first SIMD register to and from a sum of i-th to (i+x−1)-th elements of the input data series, and store the result as a p-th element in a third SIMD register, in parallel for each of a 0-th to (m−1)-th elements, so as to calculate sums of elements for m sections different from each other in parallel; and averaging processing to calculate an average value from the sums of elements stored in the third SIMD register.

12. The processor according to claim 11, wherein
the input data series includes 0-th to (n−1)-th elements, n being an integer of 2 or more, and
the input data series is expanded so that the number of elements in each section is x, so as to calculate the average value.

13. The processor according to claim 12, wherein
a mask bit corresponding to the 0-th to (n−1)-th elements of the input data series is generated, and
load processing and store processing of data of the elements corresponding to the mask bit are performed.

14. The processor according to claim 11, further comprising
a coefficient table storing inverse numbers of numbers of effective elements of each section for which the moving average is calculated, wherein
in the averaging processing, a moving average is calculated by multiplying a result of the third arithmetic operation and an inverse number obtained by referring to the coefficient table.

15. The processor according to claim 11, wherein
the processor is a SIMD type processor.

* * * * *